Aug. 6, 1940.   A. V. SEQUIN, NEE NIGGL ET AL   2,210,330
DEVICE FOR THE PREVENTION OF ACCIDENTS DUE TO OVERTIREDNESS
Filed April 22, 1938
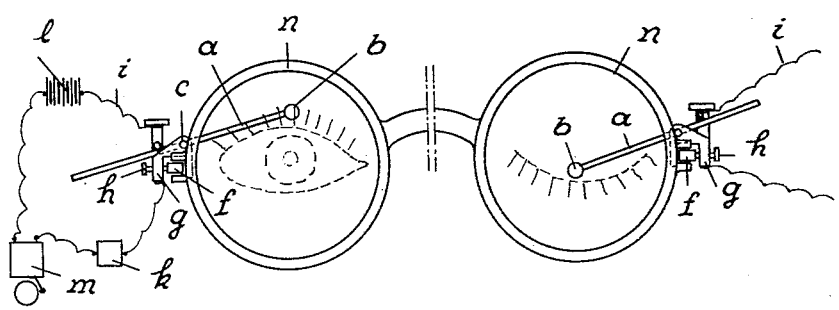

Patented Aug. 6, 1940

2,210,330

UNITED STATES PATENT OFFICE 2,210,330

DEVICE FOR THE PREVENTION OF ACCIDENTS DUE TO OVERTIREDNESS

Amalie Vera Sequin, nee Niggl, and Rolf Hirt, Heidelberg, Germany

Application April 22, 1938, Serial No. 203,684
In Germany May 27, 1937

4 Claims. (Cl. 177—311)

A considerable proportion of the daily motor car accidents, especially on the arterial roads or the country roads, is constituted by those which arise in consequence of the overtiredness of the driver. In particular the stretches of the arterial roads which are free from obstructions cause the overtired driver to fall asleep or to close the eyes if only for a short time. These short intervals of time are sufficient to cause an accident to occur.

It is the purpose of the present invention to prevent these dangerous dozings of the driver and thereby to avoid a larger number of serious accidents.

The invention consists in that the closing of the eyelids peculiar to each doze is utilised in order to set into operation in some suitable manner an alarm device which acts upon the nervous system of the individual, either acoustically or in some other manner, so that the sleeper is immediately brought back to consciousness.

In particular it provides an appliance which is so associated with the eyelid that the dropping of the eyelid necessary for sleeping will close an electric circuit which sets in operation an alarm device of any suitable type. The appliance consists of a lever mounted on a ball-joint and which at its free end is formed as a feeler and arranged in close association with the eyelid of the person concerned. The end of the feeler rests on the exterior of the eyelid above the lashes and is so light that it exerts no appreciable pressure upon the eyeball. The feeler lever is included in the current circuit and in certain positions opens or closes the said circuit. For this purpose there is provided a contact formed either as a ball socket or as a suitably shaped bow. The source of current may be a battery which may be carried in the waistcoat pocket or in any other desired location. There is also included in the circuit a delay device which ensures that the circuit will not be closed during very short closings of the eyelids, that is at each blink. The alarm device may be a bell, may be headphones, may be the imparting of a slight electric shock, or other devices may be provided which will ensure the awakening of the person concerned. The appliance is preferably secured on the temple of a pair of spectacles or incorporated into motoring goggles in some suitable manner.

The means according to the invention is not only intended for the driver of any motor or other vehicle but also for all persons in circumstances where it is absolutely necessary to remain awake, as for example airmen, guards, the army on long tiring rides or marches, especially in case of war, when no provision can be made for reliefs for special reasons.

The invention is illustrated in the accompanying drawing by way of example:

Fig. 1 and Fig. 2 each show the appliance mounted on the temple of a pair of spectacles, in combination with the opened eyelid and the closed eyelid respectively, Fig. 3 shows the appliance in front elevation, Fig. 4 is the same appliance in side elevation, Fig. 5 is another constructional form of the contact, and Fig. 6 shows the whole assembly on a pair of spectacles.

The feeler $a$ in the form of a lever is arranged to be oscillatable in all directions in the bearing block $g$ by means of a ball $c$. On the end of the lever directed towards the eye is preferably disposed a soft covering $b$. This is usually required when the feeler is made from metal, in order to obviate too hard a pressure on the ball of the eye. The feeler may, however, be made from an elastic or resilient material, such as rubber, provision being made for conducting current to a contact mounted thereon in any suitable manner. The bearing block is connected to the one pole of an electric circuit $i$ whereas the other pole of the circuit $i$ is connected to a contact plate $e$ which is secured on the bearing block with the interposition of a layer of insulation $o$. In the circuit is a battery $l$, a signalling device $m$ and a delay device $k$. The construction of this delay device may vary but its purpose is to prevent short current impulses reaching the signalling device upon the closing of the circuit for short periods, such closing being due to the lever $a$ making contact by its contact pin $d$ with the contact surface $e$. Instead of the contact surface $e$ there may be employed a resilient bow $e'$ as shown in Fig. 5. The bearing block may be clamped on the temple $f$ of the spectacles by means of the clamping screw $h$. The other components such as the battery, delay device, alarm and alarm device may then be carried in a special pocket in the clothing of the person concerned. It is preferred, however, to incorporate the whole of the parts of the device into a hood or cap or into a pair of spectacles which need only be put on when required. The incorporation into spectacles in this manner has the additional advantage that headphones may be employed as the alarm device to conduct the alarm noise direct to the ear of the man in charge without his being disturbed by the noise of the engine or of the vehicle.

The operation of the device is as follows: The end $b$ of the feeler $a$ lies upon the upper eyelid somewhat above the lashes. In this position, as is shown in Fig. 1, the circuit is interrupted. As soon as the eyelid closes the feeler moves on to the contact surface $e$ and closes the circuit $i$. The signal device immediately sounds and continues to do so until the person concerned again opens his eyes and thereby interrupts the circuit. The time constant of the appliance, that is to say the shortest period of time over which the closure of the circuit must persist in order to bring the alarm device into operation, may be adjusted at the delay device $k$.

The device is not limited to being attached laterally to a pair of spectacles. It may be attached in the centre of a lens. It may also be worn without eyeglasses, namely by being secured on a rod to pass behind the ear. It may also be secured on a cap or on some other suitable means.

We claim:

1. An improved device to overcome the tendency of a driver of an automobile or the like against dozing or sleeping while driving, including a feeler having in part a frictional association with the eyelid of the driver, an open circuit, an alarm in said circuit, and means whereby the feeler moving in response to the eyelid in closing the eye will close the circuit and sound the alarm.

2. An improved device to overcome the tendency of a driver of an automobile or the like against dozing or sleeping while driving, including a feeler, means for supporting the feeler adjacent the eye of the driver, a part of the feeler being designed to frictionally contact with the eyelid, an open circuit, an alarm in the circuit, and means carried by the feeler to close the open circuit and sound the alarm in that movement of the feeler responsive to a closing movement of the eyelid.

3. A construction as defined in claim 2, wherein the feeler is pivotally supported in an eyeglass frame.

4. An improved device to overcome the tendency of a driver of an automobile or the like against dozing or sleeping while driving, including an oscillating lever, a ball joint pivotally supporting the lever, one end of the lever being designed for frictional contact with the eyelid of the driver, a normally open circuit, an alarm in the circuit, and an element carried by the lever to close the circuit in response to lever movement during a closing movement of the eyelid.

AMALIE VERA SEQUIN, NEE NIGGL.
ROLF HIRT.